G. Munger,
Fruit Basket,
N° 50,486. Patented Oct. 17, 1865.

Witnesses:
Mary A. Hine.
Rufus Sanford.

Inventor,

UNITED STATES PATENT OFFICE.

GEORGE MUNGER, OF NEW HAVEN, CONNECTICUT.

IMPROVEMENT IN FRUIT-BASKETS.

Specification forming part of Letters Patent No. 50,486, dated October 17, 1865; antedated October 13, 1865.

*To all whom it may concern:*

Be it known that I, GEORGE MUNGER, of New Haven, in the county of New Haven and State of Connecticut, have invented a new and useful Improvement in Fruit-Baskets; and I do hereby declare the following to be a full, clear, and exact description of the same, when taken in connection with the accompanying drawings and the letters of reference marked thereon, and which said drawings constitute part of this specification, and represent, in—

Figure 2:
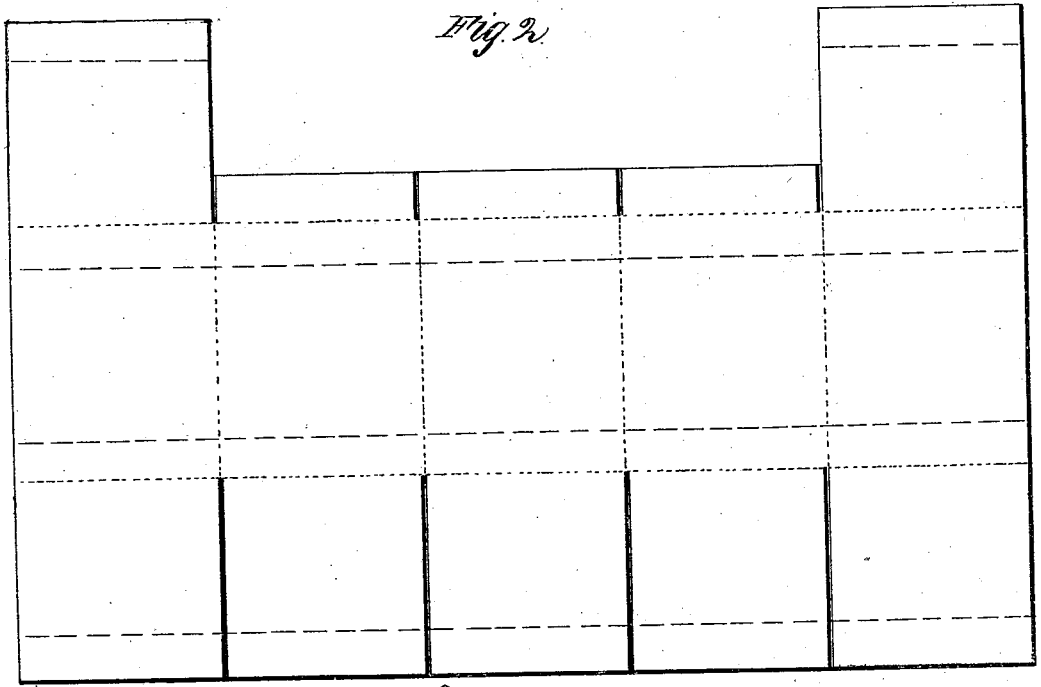
Figure 1:
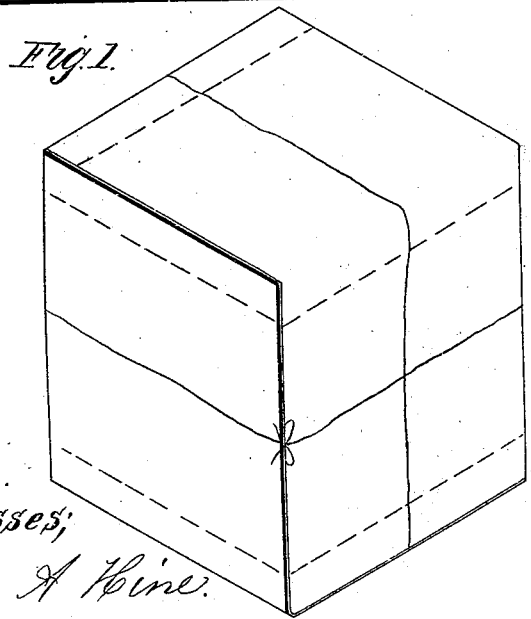

Figure 1, a perspective view closed as for packing; and in Fig. 2, a sheet from which the basket as seen in Fig. 1 is formed, reduced in size.

My invention is designed more especially for packing grapes for transportation, but it may with equal facility be used for other fruit, as berries, &c.; and my invention consists in forming a basket or case for the transportation of fruit, &c., from the material invented by me for which I have applied for Letters Patent in even date herewith entitled "Substitute for Lining-Paper, &c."

To enable others skilled in the art to construct and use my improvement, I will proceed to describe the same as fully illustrated in the accompanying drawings.

The preparation of the material, as fully described in the aforesaid application, consists in running lines of stitches of strong thread or wire across the grain of a strip of veneer cut from a log of bass-wood or similar wood in the usual manner for cutting veneers. The material thus prepared I cut into any convenient form for folding, as in Fig. 2, which is represented as five times the width of one side of the box, to form the four sides of a box, the fifth portion overlying the first side; then turn the lower ends, which are slit, as denoted in Fig. 2, inward, one overlying the other. A portion of them may be cut away, if desired. Then tack or otherwise secure the overlapped parts together. This would form a square basket open at one end, as desired, for the transportation of berries. The sides may be pierced for ventilation, if desirable.

For the transportation of grapes it is desirable to close the top of the case or basket. To do this slit the upper ends, as denoted in Fig. 2, so as to fold in like manner as described for folding the bottom, cutting away a portion of one or more of the sides, as seen in Fig. 2. Then, when the case is filled, turn the upper ends down inward and bind the whole together with a cord, as denoted in blue, Fig. 1, or otherwise. This forms a strong package-box, and very little if any more expensive than paper.

Tacking the overlapped sides as described is not necessary, as the cord placed around the box is sufficient.

One of the principal advantages which my case or basket has over the common basket is, that it is when not in use but a single sheet, like paper, so that they may be packed closely, while baskets require the same amount of room, or nearly so, empty as full.

I claim—

The herein-described fruit-basket, when constructed from one piece of veneer, stitched as described, either with or without a cover, as specified.

GEO. MUNGER.

Witnesses:
JOHN E. EARLE,
MARY A. HINE.